Jan. 16, 1962 H. A. JUDY 3,017,506

SELECTIVE SIGNAL ELIMINATOR

Filed Jan. 7, 1959 2 Sheets-Sheet 1

INVENTOR.
HAROLD A. JUDY
BY John F. Lawler
ATTORNEY

Jan. 16, 1962 H. A. JUDY 3,017,506

SELECTIVE SIGNAL ELIMINATOR

Filed Jan. 7, 1959 2 Sheets-Sheet 2

*INVENTOR.*
HAROLD A. JUDY

BY John F. Rawlen
ATTORNEY

United States Patent Office 3,017,506

Patented Jan. 16, 1962

3,017,506

SELECTIVE SIGNAL ELIMINATOR

Harold A. Judy, Sunnyvale, Calif., assignor, by mesne assignments, to Sylvania Electric Products Inc., Wilmington, Del., a corporation of Delaware Filed Jan. 7, 1959, Ser. No. 785,470
3 Claims. (Cl. 250—20)

This invention relates to superheterodyne receivers, and more particularly to a circuit which eliminates certain spurious signals appearing in the output of the mixer circuit by gating off the receiver whenever such signals are present.

When receiver input signals interact with the local oscillator signal in a non-linear frequency translation mixer of a superheterodyne receiver, difference frequencies and their harmonics, among others, appear in the output of the mixer. The intermediate frequency amplifiers discriminate against all frequencies but one, the intermediate frequency, so that only those incoming signals which differ in frequency from that of the local oscillator by the amount of this intermediate frequency are allowed to pass through the receiver. A limitation of this system is that any spurious signal which happens to show up in the mixer output at the intermediate frequency is passed through the receiver. In the past, such spurious signals were attributable to images on the opposite side of the local oscillator frequency from the desired signal, and so various images suppressing and rejection circuits have been devised to avoid these effects. In spite of these improvements, undesired signals continue to show up in receiver outputs, especially as the sensitivity of the receiver is increased.

The present invention is concerned with recognition of another possible source of spurious signals, and the provision of means to eliminate them. It is believed that a received signal having a frequency which differs from the local oscillator frequency by a submultiple $\Delta f_1$ of the intermediate frequency will in turn produce a spurious signal at the intermediate frequency as a result of the mixing action. Because of the non-linear interaction in the mixer of received signals and the local oscillator output, harmonics of the difference frequency $\Delta f_1$ are generated and such harmonics having a frequency equal to the intermediate frequency will be passed through the receiver as a spurious signal.

In accordance with this invention, a gating circuit is provided which responds to signals whose frequencies are submultiples of the intermediate to generate a gate and turn off or desensitize the receiver only while such signals are present.

A general object of the invention is to improve the selectivity of superheterodyne receivers. A more specific object is the provision of a spurious signal rejection circuit which turns off the receiver in response to submultiple frequencies of the intermediate frequency.

Other objects of the invention will become apparent from the following description of a preferred embodiment thereof, reference being had to the accompanying drawings in which.

Figure 1:
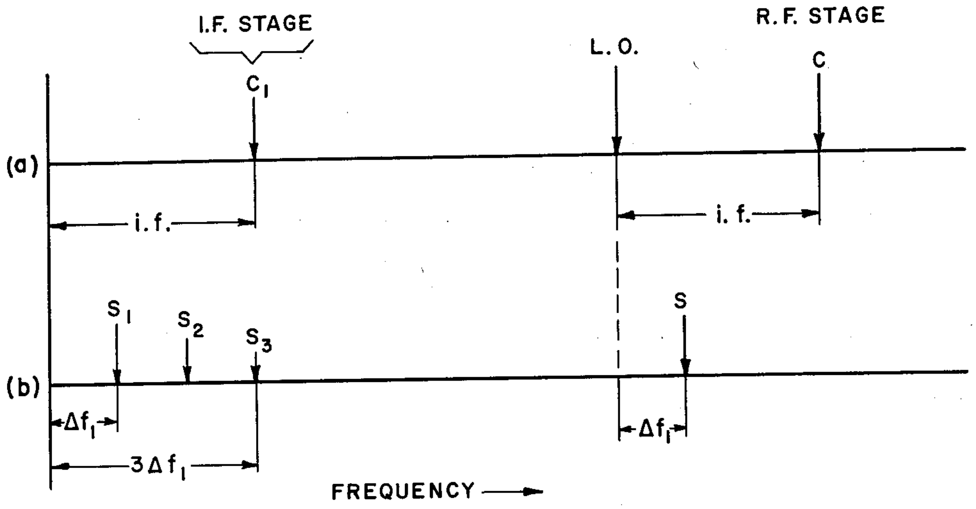
FIGURE 1 is a schematic diagram of a frequency scale which compares desired and spurious signals for the purpose of illustrating the precepts of the invention.

Referring now to the drawings, FIGURE 1(*a*) illustrates the well-known heterodyning action of a receiver, the arrows designating the local oscillator output, L.O., and the desired signal, C, at a specific radio frequency.

The difference between the local oscillator and R.F. signal frequencies, designated as the I.F. or intermediate frequency, is generated as a result of the interaction between these two signals and appears in the output of the mixer stage as intermediate frequency signal $C_1$. The stages of the receiver which follow the mixer are receptive to and will pass only signals at the intermediate frequency. While this discrimination is effective for general operation of receivers, spurious signals do appear at the intermediate frequency, especially as the sensitivity or gain of the receiver is increased. In accordance with the premise on which this invention is based, such spurious signals, or at least some of them, are derived from signals S at a radio frequency which differs from the local oscillator frequency by a submultiple of the I.F., so that harmonics of this difference frequency resulting from the mixing action become spurious signals at the intermediate frequency. For example, if $\Delta f_1$ of signal S in FIGURE 1(*b*) is one third of the I.F., the third harmonic $S_3$ of this signal falls in the I.F. band and passes through the receiver. Similarly, harmonics of other submultiple difference frequencies produce spurious responses if their signal strengths are above the threshold of the receiver. To eliminate these effects, I have provided a circuit which gates off the receiver whenever a troublesome signal at a submultiple of the intermediate frequency is received.

Figure 2:
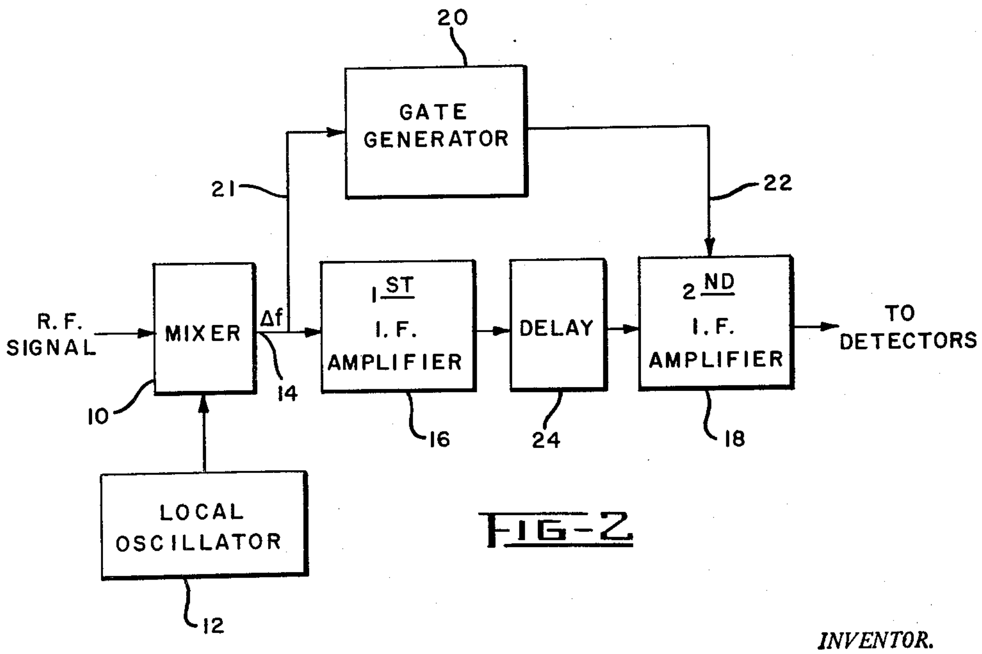
FIGURE 2 is a block diagram of the initial stages of a superheterodyne receiver which embodies my invention.

The portion of the receiver circuit which is concerned with this invention is shown in FIGURE 2 in block form, wherein the R.F. signal is supplied to the input of frequency translation mixer 10 for interaction with local oscillator 12 to produce, inter alia, difference frequencies $\Delta f$ at the output 14 of the mixer. Those difference frequencies which fall in the I.F. pass band of main amplifiers 16 and 18 are duly amplified and are passed to the detectors, but, as discussed above, harmonics of submultiples of the intermediate frequency likewise show up at the detectors. To eliminate the effects of the latter, I provide a gate generator circuit 20 which is tuned to submultiple frequencies of the intermediate frequency and which is connected to the output of the mixer 10. The gate generator comprises amplifier means tuned to those submultiple frequencies of the intermediate frequency which are likely to have harmonics sufficiently strong to exceed the threshold level of the receiver. For practical purposes, the one-half, one-third, one-fourth and one-fifth submultiples of the intermediate frequency cover the range which might possibly produce the troublesome harmonics and so the amplifier means of the gate generator is designed to be responsive to such submultiple frequencies to produce a control pulse or gate. This gate is applied to I.F. amplifier 18 through line 22 and desensitizes this stage during the duration of the gate so that the receiver is, in effect, turned off during this time. The application of the gate to amplifier 18 is timed to coincide with the passage of the spurious I.F. signal through this stage, this time coincidence being achieved with the aid of an artificial delay line 24 in the I.F. circuit.

The operation of this circuit will be understood by reference to FIGURES 1 and 2. When signal S is received at the mixer, the difference frequency $S_1$ and the second and third harmonics $S_2$ and $S_3$, respectively, of $S_1$ are generated at output 14 of the mixer. It will be noted that the strength of the signal decreases as the order of the harmonics increases, as indicated by the relative lengths of the arrows $S_1$, $S_2$ and $S_3$. Since $S_3$ appears as a desired signal at the intermediate frequency, it is amplified in the I.F. amplifiers 16 and 18. However, signal $S_1$ causes generator 20 to develop a gate which momentarily desensitizes amplifier 18 just as signal $S_3$ is passing through the amplifier. Accordingly, there is no indication of the presence of spurious signal $S_3$ at the receiver output.

Figure 3:
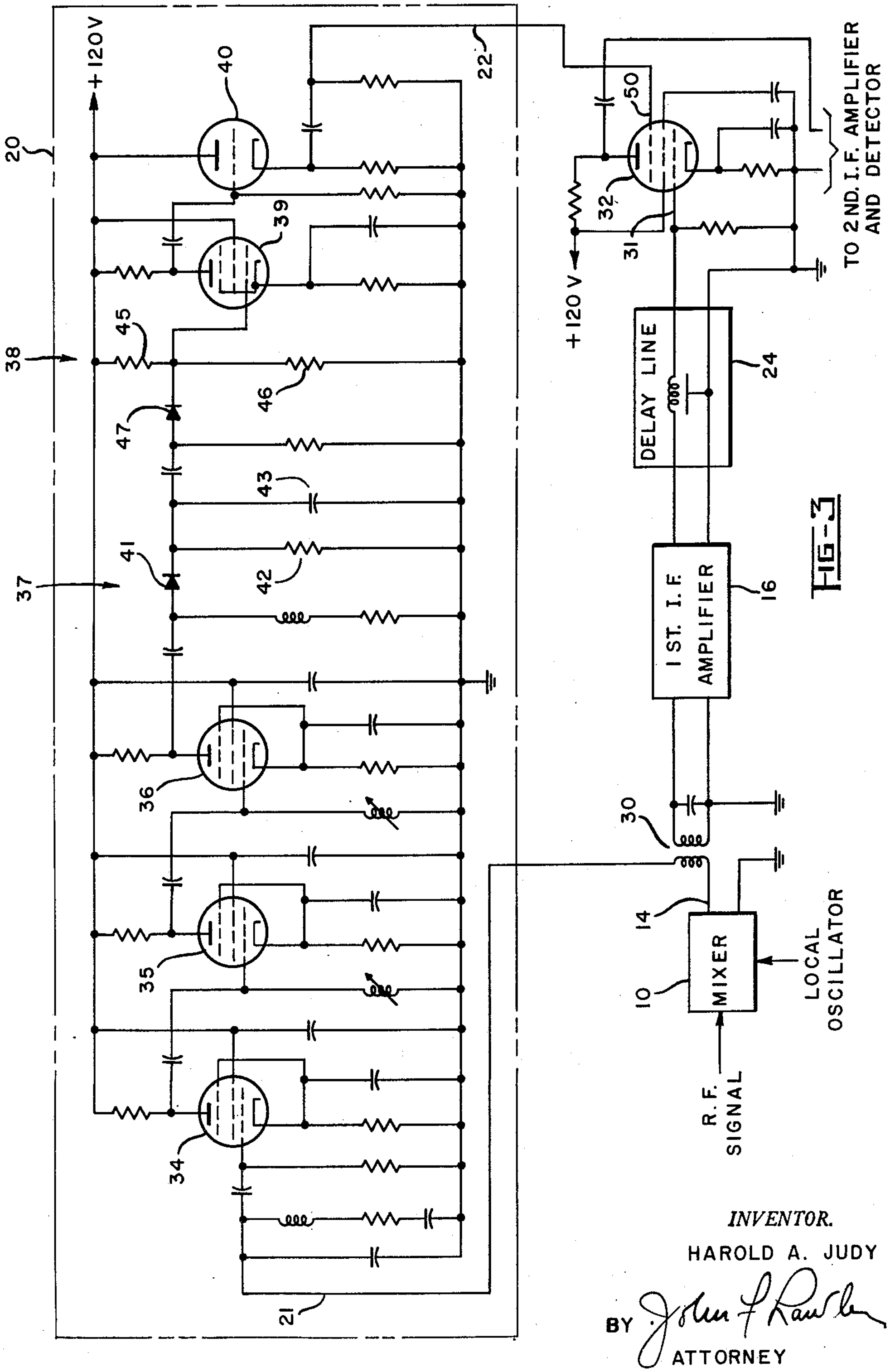
FIGURE 3 is a circuit diagram corresponding to the block diagram of FIGURE 2.

FIGURE 3 is a detailed circuit diagram of a gating circuit suitable for blocking spurious signals according to the invention. The output terminal 14 of mixer 10 is coupled by coupling transformer 30 to the first I.F. amplifier 16 whose input is tuned to the intermediate frequency. The amplified output passes through delay line 24 to the grid 31 of a control tube 32 which may be a part of the second I.F. amplifier, but which for the sake of explanation is shown separately. Tube 32, shown as a pentode, acts as an electronic switch to turn off the balance of the receiver at the proper time.

The gate generator circuit 20, enclosed in the broken line rectangle, comprises a stagger-tuned amplifier with tubes 34, 35 and 36, a detector circuit 37, a threshold circuit 38, and a gate amplifier 39 and driver 40. The three stage amplifier is designed to have a substantially flat response over the frequency band which includes the troublesome submultiple frequencies and so spurious signals in that band are duly amplified. The detector circuit 37 comprises a diode 41 in series with resistor 42 and condenser 43 for developing an output, such as a negative pulse, in response to signals in the band of the amplifier. This output pulse is then applied to threshold circuit 38 and, if the pulse is above the predetermined level of this circuit, a negative pulse is generated at the cathode of gate driver 40 which is used to trigger control tube 32. Specifically, a threshold level is established in circuit 38 by the voltage divider action of resistors 45 and 46 such that the output of diode 47, that is, the right side of diode 47 as viewed, is at a predetermined voltage, say 0.5 volt, while the opposite or input side of the diode is at ground. Signals below the 0.5 volt are ineffective to operate the diode, but signals above that level cause the diode to conduct. The resulting pulse is amplified and inverted by amplifier 39, and driver 40 ultimately produces a control pulse which operates control tube 32.

The threshold circuit described above provides the gate generator circuit with an additional selectivity that essentially discriminates against spurious signals too weak to cause difference frequency harmonics which are stronger than the receiver threshold level. This discrimination results from the fact that the energy level of signals at submultiples of the I.F. must be relatively high in order that there be sufficient energy in the harmonics thereof to interfere with the desired signals. For example, assume the receiver has a 30 megacycle intermediate frequency. The second harmonic of a 15 megacycle signal will appear as a spurious 30 megacycle signal. However, normally there is about a 40 db drop in power between the fundamental and second harmonic of a signal. Since the threshold of the receiver is limited, say to about 10 microvolts, it takes a submultiple signal of about 1000 microvolts to produce a troublesome second harmonic at the receiver threshold level. In other words, a 15 megacycle signal of less than 500 microvolts generates a 30 megacycle harmonic in the order of 5 microvolts, which is less than receiver threshold, and so such signals are self-eliminating. It is only when this 15 megacycle signal exceeds a predetermined energy level at which its second harmonic first passes the receiver threshold that the gating circuit is operative to blank the receiver. The blanking of the receiver is thus closely related to the presence of sufficiently strong signals at submultiple frequencies of the intermediate frequency, and the efficiency of the rejection circuit is therefore enhanced by the threshold circuit 38.

The output of gate driver tube 40, which is also a negative pulse, is applied to the suppressor grid 50 of control tube 32 and, for the duration of the pulse, essentially blocks any signals which are impressed on grid 31 at the same time. Delay line 24 permits the necessary synchronization of signals passing through the gate generator and I.F. channels so that control tube 32 is blanked at the precise moment the spurious harmonic reaches grid 31 of that tube.

In practical form, a gating circuit which is responsive to the second, third, fourth and fifth submultiples of the intermediate frequencies eliminates, for the most part, the spurious signals resulting from harmonics of these submultiple frequencies. In other words, there are only a certain number of submultiple frequencies which are likely to produce interfering spurious signals because of the fall off of energy content in the higher order harmonics. There are inconsequentially few spurious signals which are generated as sixth or greater harmonics that are sufficiently strong to pass the threshold of the receiver itself. By way of example, in a receiver having an intermediate frequency of 30 megacycles, a gating circuit constructed in accordance with this invention and successfully tested had a frequency response covering a 4 to 18 megacycle per second band. It may be noted that even in the unusual case where a higher order submultiple, the tenth, for example, is present and is sufficiently strong to cause spurious reception, its second, third, etc., harmonics would be within the 4 to 18 megacycle band and would generate the desired gate.

While I have shown and described my invention in a preferred embodiment, it will be apparent to those skilled in the art that modifications can be made within the scope and sphere of my invention as defined in the claims which follow.

I claim:

1. In a superheterodyne receiver having a radio frequency signal input, the combination of a frequency translation mixer connected to said input, a local oscillator having an output connected to said mixer for combining with the radio frequency signal input to produce at the mixer output a signal at a predetermined intermediate frequency, a gate generator comprising an auxiliary intermediate frequency signal amplifier having an output and an input connected to the output of said mixer, said auxiliary amplifier being tuned to receive and amplify signals at frequencies which are submultiples of said predetermined intermediate frequency, a detector having an input connected to the output of said auxiliary amplifier and having an output for producing a gate; a main intermediate frequency signal amplifier connected to the output of said mixer and tuned to amplify only signals at said predetermined intermediate frequency, said main amplifier having an output, an electronic switch connected to the output of said main amplifier and responsive to said gate to pass or block output signals from said main amplifier, and means for connecting the output of said detector to said electronic switch for operating same whereby the output of the main amplifier is blocked when a gate is produced by said detector.

2. In a superheterodyne receiver having a radio frequency signal input, the combination of a frequency translation mixer connected to said input, a local oscillator having an output connected to said mixer for combining with the radio frequency signal input to produce at the mixer output a signal at a predetermined intermediate frequency, a gate generator comprising an auxiliary intermediate frequency signal amplifier having an output and an input connected to the output of said mixer, said auxiliary amplifier being tuned to receive and amplify signals at frequencies which are submultiples of said predetermined intermediate frequency, a detector having an input connected to the output of said auxiliary amplifier and having an output for producing a gate; main intermediate frequency signal amplifier means connected to the output of said mixer and tuned to amplify signals at said predetermined intermediate frequency, means for connecting the output of said detector to said main amplifier means, said main amplifier means being responsive to the output of said detector and blocking transmission of signals therethrough in presence of a gate and passing signals in the absence of a gate.

3. In a superheterodyne receiver having a radio frequency signal input, the combination of a frequency translation mixer connected to said input, a local oscillator having an output connected to said mixer for combining with the radio frequency signal input to produce at the mixer output a signal at a predtermined intermediate frequency, a gate generator comprising an auxiliary intermediate frequency signal amplifier having an output and an input connected to the output of said mixer, said auxiliary amplifier being tuned to receive and amplify signals at frequencies which are submultiples of said predetermined intermediate frequency, a detector having an input connected to the output of said auxiliary amplifier and having an output for producing a gate; a main signal amplifier channel connected to the output of said mixer comprising a main intermediate frequency amplifier tuned to amplify signals at said predetermined intermediate frequency, and means for connecting the output of said detector to said main amplifier channel for blocking transmission of output signals from said main amplifier through said channel.

References Cited in the file of this patent

UNITED STATES PATENTS

| | | |
|---|---|---|
| 2,416,895 | Bartelink | Mar. 4, 1947 |
| 2,480,599 | Oxford | Aug. 30, 1949 |
| 2,532,308 | Hess | Dec. 5, 1950 |
| 2,828,415 | Greefkes et al. | Mar. 25, 1958 |